United States Patent [19]

Tamari et al.

[11] Patent Number: 5,009,712

[45] Date of Patent: Apr. 23, 1991

[54] NON-MAGNETIC PIGMENTS

[75] Inventors: Kousaku Tamari; Tsutomu Katamoto, both of Hiroshima, Japan

[73] Assignee: Toda Kogyo Corp., Hiroshima, Japan

[21] Appl. No.: 448,196

[22] Filed: Dec. 14, 1989

[30] Foreign Application Priority Data

Dec. 23, 1988 [JP] Japan .................................. 63-326420
Nov. 7, 1989 [JP] Japan .................................. 1-290783
Nov. 7, 1989 [JP] Japan .................................. 1-290784

[51] Int. Cl.$^5$ .............................................. C09C 1/22
[52] U.S. Cl. ................................... 106/456; 252/62.6
[58] Field of Search ....................... 106/456; 252/62.6; 423/594, 633

[56] References Cited

U.S. PATENT DOCUMENTS 4,201,762  5/1980  Daly ..................... 423/633
4,898,619  2/1990  Clifford et al. ..................... 106/459

FOREIGN PATENT DOCUMENTS 1-100029 of 1989 Japan .

*Primary Examiner*—William R. Dixon, Jr.
*Assistant Examiner*—Chris Gallo
*Attorney, Agent, or Firm*—Nixon & Vanderhye

[57] ABSTRACT

Disclosed herein is a non-magnetic pigment comprising plate-like potassium ferrite particles having an average diameter of 0.03–30.0 μm and a process for producing the same.

18 Claims, 3 Drawing Sheets

NON-MAGNETIC PIGMENTS

BACKGROUND OF THE INVENTION

The present invention relates to nonmagnetic pigments composed of plate-like potassium ferrite particles having an average particle diameter of 0.03–30.0 μm, and a process for producing the same.

In recent years, from the viewpoint of a rise of work efficiency for the purpose of energy saving, and an improvement paint or resin properties, in the manufacture of paints and coloring of resin, a requirement has emerged for improved dispersibility of pigment particle in vehicles or resins, improved workability and improved heat stability.

To improve dispersibility and workability, the pigment particles must be non-magnetic and plate-like, must be independently distributed, and must be of suitable size. A particularly desirable particle diameter is 0.03–30.0 μm.

Insofar as concerns heat stability, with regard to mixing of pigment particles with resins and injection-molding of the products, the temperature may rise as high as about 300° C. It is, therefore, required that the mixture is stable at these temperatures without change of color or degradation of properties.

At the same time, with the recent improvement of cultural and living standards, it is no longer sufficient to improve the functional qualities of products, and it is required to give them an aesthetic, interesting external appearance. With regard to color, for example, there is a strong demand for variegated hues and tones.

The most typical example of a pigment with universal application is that of iron oxide powder. Hematite particles is widely used as a red-brown pigment, maghemite particles as a light brown pigment, and magnetite particles as a black pigment.

Hematite particles, which is very well-known, are non-magnetic plate-like particles which are independently distributed and of suitable size. The particles usually have a diameter in the range of 0.1–100 μm.

Maghemite particles are magnetic, and they, therefore, reagglomerate easily. The particles are usually granular or acicular. When the maghemite particles are heated at a temperature above 300°–400° C., they begins to change into hematite, and the light brown color of the maghemite particles, therefore, begins to show signs of red brown.

Like maghemite particles, magnetite particles are magnetic, and, therefore, tend to reagglomerate easily. They are also usually granular or acicular. When the magnetite particles are heated at a temperature above 200°–300° C., the magnetite particles begins to change into maghemite, and the black color starts to give way to light brown.

At present, therefore, there is a strong demand for pigment powders with excellent dispersibility, workability and heat stability, and which also offer a variety of colors.

As a result of the present inventors' intensive research in order to provide such a pigment which satisfies the above requirements, it has been found that by heat-treating a mixture of iron oxide particles and/or ferric oxide hydroxide particles having an average diameter of 0.003–30.0 μm with potassium carbonate and one or more fusing agents selected from the group alkali metal chloride, sulfate, borate and silicate, at a temperature of 830°–1200° C., a non-magnetic pigment showing excellent workability and heat stability has been obtained. The present invention has been attained based on this finding.

SUMMARY OF THE INVENTION

In a first aspect of the present invention, there is provided a non-magnetic pigment comprising plate-like potassium ferrite particles having an average particle diameter of 0.03–30.0 μm.

In a second aspect of the present invention, there is provided a non-magnetic, dark brown pigment comprising plate-like potassium ferrite particles having an average particle diameter of 0.03–30.0 μm containing Mn in the form of solid solution.

In a third aspect of the present invention, there is provided a non-magnetic, dark brown pigment comprising plate-like potassium ferrite particles having an average particle diameter of 0.03–30.0 μm containing Mn and Al in the form of solid solution.

In a fourth aspect of the present invention, there is provided a non-magnetic, bright light brown pigment comprising plate-like potassium ferrite particles having an average particle diameter of 0.03–30.0 μm containing Al in the form of solid solution.

In a fifth aspect of the present invention, there is provided a process for producing the nonmagnetic pigment as in the first aspect, comprising heat-treating a mixture of iron oxide particles and/or ferric oxide hydroxide particles having an average particle diameter of 0.003–30.0 μm with potassium carbonate and one or more fusing agents selected from the group alkali metal chloride, sulfate, borate and silicate, at a temperature of 830°–1200° C.

In a sixth aspect of the present invention, there is provided a process for producing a non-magnetic pigment as in the second aspect, comprising heat-treating a mixture of iron oxide particles and/or ferric oxide hydroxide particles having an average particle diameter of 0.003–30.0 μm with potassium carbonate and one or more fusing agents selected from the group alkali metal chloride, sulfate, borate and silicate, at a temperature of 830°–1200° C., (i) Mn-containing iron oxide particles being used as the iron oxide particles, (ii) Mn-containing ferric oxide hydroxide particles being used as the ferric oxide hydroxide particles, or (iii) Mn compounds being added to the mixture, so as to contain 0.1–20.0 atomic % of Mn in the heat-treated product with respect to the total amount of Fe and Mn.

In a seventh aspect of the present invention, there is provided a process for producing a non-magnetic pigment as in the third aspect, comprising heat-treating a mixture of iron oxide particles and/or ferric oxide hydroxide particles having an average particle diameter of 0.003–30.0 μm with potassium carbonate and one or more fusing agents selected from the group alkali metal chloride, sulfate, borate and silicate, at a temperature of 830°–1200° C., (i) Mn and Al-containing iron oxide particles being used as the iron oxide particles, (ii) Mn and Al-containing ferric oxide hydroxide particles being used as the ferric oxide hydroxide particles, or (iii) Mn compounds and Al compounds being added to the mixture, so as to containing 0.1–20.0 atomic % of Mn and not more than 60.0 atomic % of Al in the heat-treated product with respect to the total amount of Fe, Mn and Al.

In an eighth aspect of the present invention, there is provided a process for producing a non-magnetic pigment as in the fourth aspect, comprising heat-treating a mixture of iron oxide particles and/or ferric oxide hydroxide particles having an average particle diameter of 0.003–30.0 μm with potassium carbonate and one or more fusing agents selected from the group alkali metal chloride, sulfate, borate and silicate, at a temperature of 830°–1200° C., (i) Al-containing iron oxide particles being used as the iron oxide particles, (ii) Al-containing ferric oxide hydroxide particles being used as the ferric oxide hydroxide particles, or (iii) Al compounds being added to the mixture so as to contain 0.1–80.0 atomic % of Al in the heat-treated product with respect to the total amount of Fe and Al.

DETAILED DESCRIPTION OF THE INVENTION

The non-magnetic pigments of the present invention are classified according to their color as follows:

(1) A non-magnetic light brown pigment comprising plate-like potassium ferrite particles having an average particle diameter of 0.03–30.0 μm.

(2) A non-magnetic dark brown pigment comprising plate-like potassium ferrite particles having an average particle diameter of 0.03–30 μm, containing Mn in the form of solid solution.

(3) A non-magnetic dark brown pigment comprising plate-like potassium ferrite particles having an average particle diameter of 0.03–30.0 μm, containing Mn and Al in the form of solid solution.

(4) A non-magnetic bright light brown/orange-red pigment comprising plate-like potassium ferrite particles having an average particle diameter of 0.03–30.0 μm, containing Al in the form of solid solution.

The potassium ferrite particles of the present invention are independent, are non-magnetic and heat-stable, and have a light brown, dark brown or bright light brown/orange-red color.

The potassium ferrite of the present invention is composed of either potassium $\beta''$ ferrite ($K_2O \cdot nFe_2O_3$, wherein n = 6.0–4.5), potassium $\beta$ ferrite ($KFe_{11}O_{17}$), or a mixture of these two compounds.

The potassium ferrite particles of the present invention do not undergo any color change when heated to a temperature of about 550° C., and have excellent heat-stability.

In the Journal of Crystal Growth, Vol. 71 (1985), p. 253–255, for example, large monocrystalline particles of potassium ferrite of 1–2 mm in size are disclosed; in Electrochemistry, Vol. 43 (1975), p. 273–277, a sintered body of potassium ferrite as a material for the study of ion conductivity is mentioned; and in Japanese Patent Application Laid Open (KOKAI) No. 1 - 100027 (1989), a catalyst for production of styrene is described. There is, however, no description of the size, shape or color of potassium ferrite particles for use as pigments, nor of the dispersibility and heat-stability thereof.

The pigments of the present invention are non-magnetic.

The meaning of non-magnetic in the present invention is that the pigments are effectively without any magnetization, and more specifically, that they have a magnetization of not greater than 2.0 emu/g.

The potassium ferrite particles of the present invention are plate-like. The meaning of plate-like in the present invention is that the particles are substantially thin, and more specifically, that they have an aspect ratio (ratio of plate diameter to thickness) in the range of 3:1–20:1.

In said light brown pigment (1) of the present invention, the potassium ferrite particles have a lightness $L^*$ of 30–45, a hue $\theta = \tan^{-1} b^*/a^*$ of 33°–55°, and a chroma $C^*ab = \sqrt{a^{*2} + b^{*2}}$ of 15–27 [wherein $L^*$, $a^*$ and $b^*$ are values represented by the ($L^*$, $a^*$, $b^*$) uniform sensory color space of the CIE, 1976].

In said dark brown pigment (2) of the present invention, the potassium ferrite particles containing Mn in the form of solid solution have a lightness $L^*$ of 20–38, a hue $\theta = \tan^{-1} b^*/a^*$ of 20°–50°, and a chroma $C^*ab = \sqrt{a^{*2} + b^{*2}}$ of 1–30 [wherein $L^*$, $a^*$ and $b^*$ are values represented by the ($L^*$, $a^*$, $b^*$) uniform sensory color space of the CIE, 1976].

In said dark brown pigment (3) of the present invention, the potassium ferrite particles containing Mn and Al in the form of solid solution have a lightness $L^*$ of 20–40, a hue $\theta = \tan^{-1} b^*/a^*$ of 20°–50°, and a chroma $C^*ab = \sqrt{a^{*2} + b^{*2}}$ of 1–30 [wherein $L^*$, $a^*$ and $b^*$ are values represented by the ($L^*$, $a^*$, $b^*$) uniform sensory color space of the CIE, 1976].

In said bright light brown/orange-red pigment (4) of the present invention, the potassium ferrite particles containing Al in the form of solid solution have a lightness $L^*$ of 30–48, a hue $\theta = \tan^{-1} b^*/a^*$ of 30°–50°, and a chroma $C^*ab = \sqrt{a^{*2} + b^{*2}}$ of 15–50 [wherein $L^*$, $a^*$ and $b^*$ are values represented by the ($L^*$, $a^*$, $b^*$) uniform sensory color space of the CIE, 1976].

If the particles are of approximately the same shape and, in particular, the same size, the orange color increases and tends to become lighter as the amount of Al in the form of solid solution increases, so that a bright light brown/orange-red color is obtained.

As an iron starting material of the present invention, iron oxide particles such as hematite, magnetite and maghemite, and/or ferric oxide hydroxide particles such as goethite, acagenite or lepidochrosite, both of average particle size in the range of 0.003–30.0 μm may be used. If the average particle size exceed 30.0 μm, the potassium ferrite particles having the particle size specified in the present invention is not obtained.

There is a correlation between the size of iron oxide particles or ferric oxide hydroxide particles as the starting material and the size of potassium ferrite particles produced, the size of potassium ferrite particles tending to increase in proportion to the size of the starting material.

In the present invention, the mixing proportion of iron oxide particles and/or ferric oxide hydroxide particles with potassium carbonate is such that the molar ratio of K to Fe, Fe+Mn, Fe+Mn+Al or Fe+Al is 18-28 mol %. If it is less than 18 mol %, hematite particles come to be mixed with potassium ferrite particles. If it is greater than 28 mol %, very unstable $KFeO_2$ is produced instead of potassium ferrite.

As the Mn compound used in the present invention manganese dioxide and manganese tetraoxide may be used.

As the Al compound in the present invention, AlOOH, $Al(OH)_3$, $\gamma$-$Al_2O_3$ or $\eta$-$Al_2O_3$ may be used.

In the case of said dark brown pigment (2) of the present invention, a Mn content of the iron oxide particles or of the ferric oxide hydroxide particles, or an amount of Mn compounds added to the mixture is such that the quantity of Mn in the heat-treated product is 0.1-20.0 atomic % with respect to the total amount of Fe and Mn. If it is less than 0.1 atomic %, the non-magnetic dark brown plate-like pigment powder of the present invention is not obtained, and if it is greater than 20.0 atomic %, other compounds than the potassium ferrite phase are produced.

In the case of said dark brown pigment (3) of the present invention, a Mn content of the iron oxide particles or of the ferric oxide hydroxide particles, or an amount of Mn compounds added to the mixture, is such that the quantity of Mn in the heat-treated product is 0.1-20.0 atomic % with respect to the total amount of Fe, Mn and Al. An Al content of the iron oxide particles or of the ferric oxide hydroxide particles, or an amount of Al compounds added to the mixture, is such that the quantity of Al in the heat-treated product is not more than 60.0 atomic % with respect to the total amount of Fe, Mn and Al. If it is greater than 60.0 atomic %, the chroma of the potassium ferrite particles obtained increases and a dark brown pigment is difficult to obtain.

In the case of said bright light brown/orangered pigment (4) of the present invention, an Al content of the iron oxide particles or of the ferric oxide hydroxide particles, or an amount of Al compounds added to the mixture, is such that the quantity of Al in the heat-treated product is 0.1-80.0 atomic % with respect to the total amount of Fe and Al. If it is less than 0.1 atomic %, potassium ferrite particles containing Al in the form of solid solution are obtained, but they do not perform adequately as a bright light brown pigment. If it is greater than 80.0 atomic %, potassium ferrite particles containing Al in the form of solid solution are obtained, but they have a lower tinting strength and hiding power which is undesirable for a pigment.

The fusing agent of the present invention is one or more compounds selected from the group alkali metal chloride, sulfate, borate and silicate, and boric acid may also be used, if necessary.

With alkali metal sulfates and silicates, as compared to alkali metal chlorides, the potassium ferrite tends to be finer, and this is particularly useful when it is desired to obtain finer particles. With alkali metal borates, as compared to alkali metal chlorides, the growth of potassium ferrite particles tends to be promoted. By combining these various fusing agents, therefore, the size of the potassium ferrite particles produced can be freely controlled depending on the objective.

If boric acid is used alone in the present invention, potassium ferrite is not produced. If, however, it is used in conjunction with the alkali metal chlorides, sulfates, borates and silicates, the growth of potassium ferrite particles tends to be promoted.

Suitable alkali metal chlorides for this purpose are KCl and NaCl.

Suitable alkali metal sulfates for this purpose are $K_2SO_4$ and $Na_2SO_4$.

Suitable alkali metal borates for this purpose are potassium borate and sodium borate.

Suitable alkali metal silicates for this purpose are potassium silicate and sodium silicate.

An amount of fusing agents added to the system, is 0.5-300% by weight with respect to:
(i) the total amount of iron oxide particles or ferric oxide hydroxide particles and potassium carbonate.
(ii) the total amount of iron oxide particles or ferric oxide hydroxide particles and Mn compounds, or Mn compounds and Al compounds,
(iii) the total amount of iron oxide particles or ferric oxide hydroxide particles, Al compounds and potassium carbonate.

If it is less than 0.5% by weight, inter-particle sintering takes place with the result that an independent distribution of potassium ferrite particles is not obtained. If it is greater than 300% by weight, an independent distribution of potassium ferrite particles is obtained, however there is no reason to add any more fusing agent than is necessary.

The heat-treating temperature used in the present invention is 830°-1200° C. If it less than 830° C., potassium ferrite is not produced. If it is greater than 1200° C., the fusing agents volatilize, and inter-particle sintering takes place.

The quantity of Mn in the form of solid solution in the present invention is 0.1-20.0 atomic % with respect to the total amount of Fe and Mn. If it is less than 0.1 atomic %, the chroma increases and a dark brown pigment is difficult to obtain. If it is more than 20.0 atomic %, other compounds than the potassium ferrite phase come to be mixed with the product.

The quantity of Al in the form of solid solution with Mn in the form of the solid solution in the present invention is not more than 60.0 atomic % with respect to the total amount of Fe, Mn and Al. If it is more than 60.0 atomic %, the chroma of the potassium ferrite obtained increases, and a dark brown pigment is difficult to obtain.

The quantity of Al in the form of solid solution in the present invention is 0.1-80.0 atomic % with respect to the total amount of Fe and Al. If it less than 0.1 atomic %, the bright light brown pigment of the present invention is not obtained. If it is more than 80.0 atomic %, the potassium ferrite particles containing Al in the form of solid solution have a lower tinting strength and hiding power which is undesirable for a pigment.

Said non-magnetic pigment (1) of the present invention has a lightness L* of 30-45, preferably 31-42; a hue $\theta$ of 33°-55°, preferably 33°-50°; a chroma C*ab of 15-27, preferably 17-25; and a magnetization of not more than 2.0 emu/g, preferably not more than 1.0 emu/g; and shows a light brown color. The potassium ferrite particles of the pigment (1) have an average particle diameter of 0.03-30.0 μm, preferably 0.1-20.0μm; and an aspect ratio of 3:1-20:1, preferably 5:1-20:1.

Said non-magnetic pigment (2) of the present invention has a lightness L* of 20-38, preferably 20-35 ; a hue $\theta$ of 20°-50°, preferably 25°-45°; a chroma C*ab of 1-30, preferably 1-20 ; and a magnetization of not more than 2.0emu/g, preferably not more than 1.0emu/g; and shows a dark brown color. The potassium ferrite particles of the pigment (2) have an average particle diameter of 0.03–30.0 μm, preferably 0.1–20.0 μm; and an aspect ratio of 3:1–20:1, preferably 5:1–20:1. The quantity of Mn in the form of solid solution with respect to the total amount of Fe and Mn is 0.1–20.0 atomic %, preferably 5.0–15.0 atomic %.

Said non-magnetic pigment (3) of invention has a lightness $L^*$ of 20–40, preferably 20–35 ; a hue $\theta$ of 20°–50°, preferably 25°–45° ; a chroma $C^*ab$ of 1–30, preferably 1–20; and a magnetization of not more than 2.0 emu/g, preferably not more than 1.0 emu/g; and shows a dark brown color. The potassium ferrite particles of the pigment (3) have an average particle diameter of 0.03–30.0 μm, preferably 0.1–20.0μm; and an aspect ratio of 3:1–20:1, preferably 5:1–20:1. The quantity of Mn in the form of solid solution with respect to the total amount of Fe, Mn and Al is 0.1–20 atomic %, preferably 5.0–15.0 atomic %; and the quantity of Al in the form of solid solution with respect to the total amount of Fe, Mn and Al is not more than 60 atomic %, preferably 5.0–15.0 atomic %.

Said non-magnetic pigment (4) of the present invention has a lightness $L^*$ of 30–48, preferably 35–48 ; a hue $\theta$ of 30°–50°, preferably 35°–50°; a chroma $C^*ab$ of 15–50, preferably 25–50; and a magnetization of not more than 2.0 emu/g, preferably not more than 1.0 emu/g; and shows a bright light brown/orange-red color. The potassium ferrite particles of the pigment (4) have an average particle diameter of 0.03–30.0 μm, preferably 0.1–20.0 μm; and an aspect ratio of 3:1–20:1, preferably 5:1–20:1. The quantity of Al in the form of solid solution with respect to the total amount of Fe and Al is 0.1–80 atomic %, preferably 5.0–60.0 atomic %.

As the non-magnetic pigment powder of the present invention comprises non-magnetic plate-like particles which are independently distributed and of suitable size, in particular, of an average particle size in the range of 0.03–30.0 μm, it has excellent dispersibility, workability and heat stability. It is, therefore, highly useful as a coloring pigment powder for paints, printing inks and resins.

Further, as the potassium ferrite particles of the present invention are plate-like, hard and heavy, they may have application as an anti-vibration filler; and as the electron donating ability of $K^+$ is greater than that of $Na^+$, they may also have application as a catalyst in the synthesis of styrene monomer.

The present invention will be more precisely explained while referring to the following examples.

It should, however, be understood that the present invention is not restricted to the following examples. From the foregoing description, one skilled in the art can easily ascertain the essential characteristics of the present invention, and without departing from the spirit and scope thereof, can make various changes and modifications of the invention to adapt it to various usages and conditions.

EXAMPLES

It should be noted that the average particle diameters given in the following examples and comparative examples, are average values measured from electron micrographs.

The $L^*$ (lightness), and values of $a^*$ and $b^*$, were measured using color measurement test samples and a multi-source color spectrophotometer MSC-IS-2D (Suga Test Instruments K.K.) in the Hunter Lab Space, and represented in terms of the uniform sensory color space of the Commission Internationale de l'Eclairage, CIE (1976).

Test samples were obtained by kneading 0.5 g of potassium ferrite particle together with 1.0 cc of castor oil in a Hoover type muller to make a paste, adding 4.5 g of clear lacquer and kneading the mixture to make a paint, and coating the paint onto cast-coated paper using a 6-mil applicator.

EXAMPLE 1

A mixture of 14.5 g of spherical magnetite particles having an average particle diameter of 0.02 μm, 1.73 g of $K_2CO_3$ and 1.6 g of KCl (the quantity of KCl with respect to total weight of magnetite and $K_2CO_3$ is 10% by weight, was heat-treated at 875° C. in air for 1.0 hour. The obtained product was washed with water, and then dried, thereby obtaining light brown particles.

Figure 1:
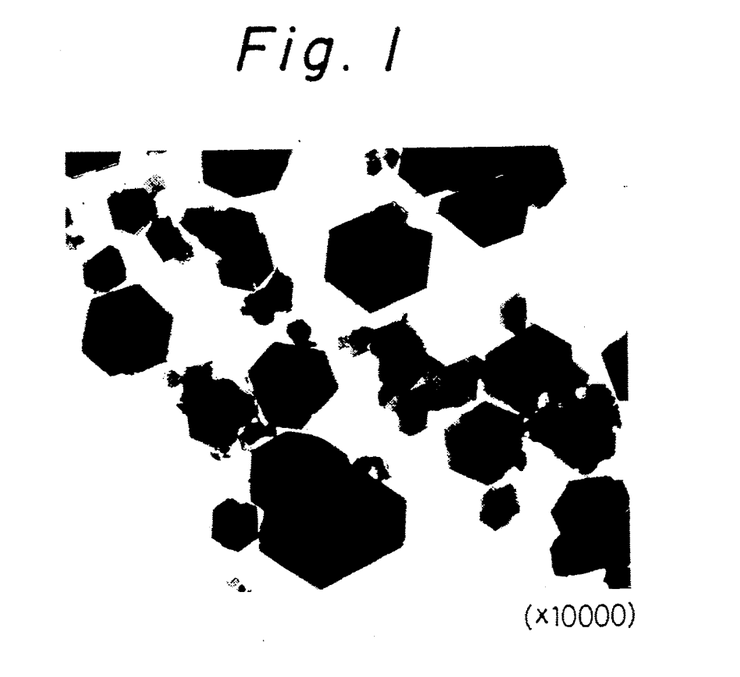
FIGS. 1 and 3 are electron micrographs showing the particle structure of the potassium ferrite particles obtained in Example 1 and Example 2 respectively.

As shown by the electron micrograph in FIG. 1 ($\times$ 10,000), the light brown particles were plate-like particles of an average particle diameter of 1.5 μm, and were independently distributed. The obtained particles had a lightness $L^*$ of 32.87, a hue $\theta = \tan^{-1} b^*/a^*$ of 37.96°, and a chroma $C^*ab = \sqrt{a^{*2} + b^{*2}}$ of 19.62.

Figure 2:
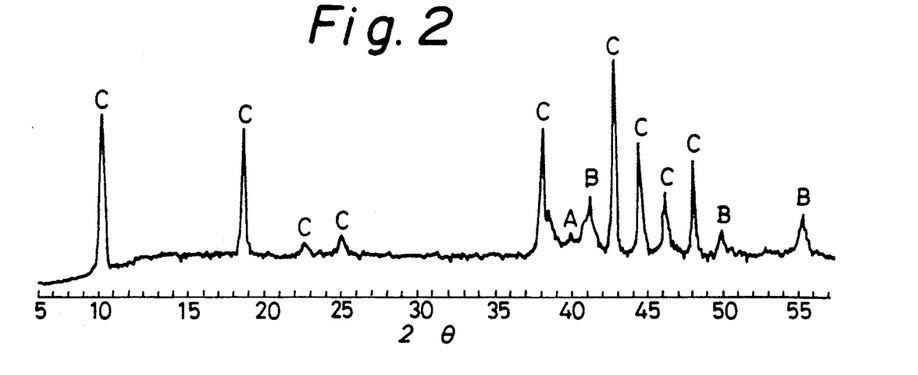
FIG. 2 is an X-ray diffraction pattern of the potassium ferrite particles obtained in Example 1.

Further, as seen from an X-ray diffraction pattern in FIG. 2, peaks corresponding to potassium $\beta$ ferrite and potassium $\beta''$ ferrite were found. In FIG. 2, peak A corresponds to potassium $\beta$ ferrite, peaks B correspond to potassium $\beta''$ ferrite, and peaks C are due to both potassium $\beta$ ferrite and potassium $\beta'$ ferrite. By the application of an external magnetic field of 10 KOe, a magnetization was approx. 0.83 emu/g, which is roughly about the same as for hematite.

The obtained light brown particles were further heated at 550° C. for 2.0 hours to examine its heat-stability. The resulting light brown particles had a lightness $L^*$ of 32.87, a hue $\theta = \tan^{-1} b^*/a^*$ of 37.96°, and a chroma $C^*ab = \sqrt{a^{*2} + b^{*2}}$ of 19.62. This confirmed that there was substantially no color change, and that the powder has excellent heat stability.

EXAMPLES 2–10

Potassium ferrite particles were produced in the same way as in Example 1, excepting that the kinds and amounts of iron oxide particles and ferric oxide hydroxide particles, the amount of $K_2CO_3$ used, the kinds and amounts of fusing agents, and the heat-treating temperature and time were varied.

Examination of electron micrographs showed that the potassium ferrite particles obtained in Examples 2–10 were independently distributed.

Figure 3:
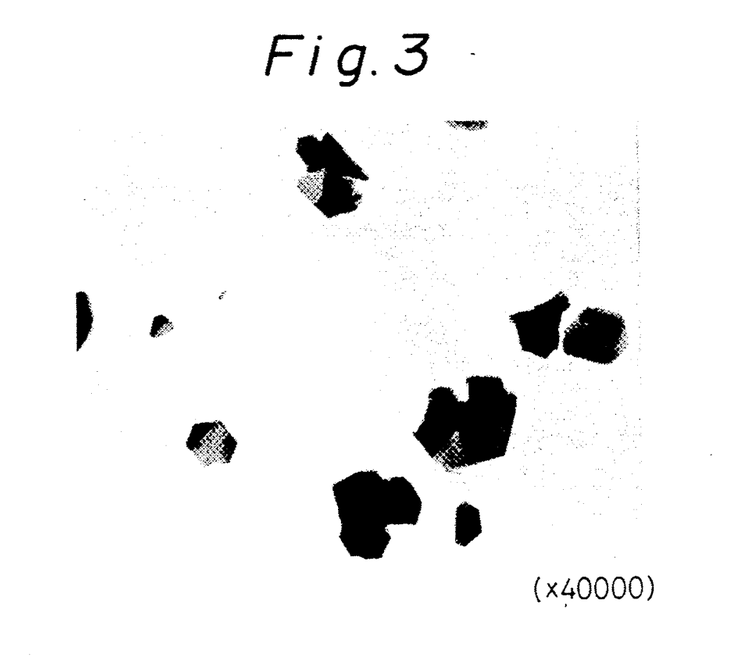

FIG. 3 shows the electron micrograph of the potassium ferrite particles obtained in Example 2 ($\times$ 40,000).

COMPARATIVE EXAMPLE 1

A red-brown particle powder was obtained in the same way as in Example 1, excepting that $B_2O_3$ was used as a fusing agent.

The X-ray diffraction pattern showed that this red brown powder was hematite, and that potassium ferrite was not produced

EXAMPLE 11

A mixture of 14.5 g of spherical magnetite particles having an average particle diameter of 0.02 μm, 2.03 g of $K_2CO_3$, 2.61 g of $Mn_2O_3$ [corresponding to 15.0 atomic % calculated as Mn/(Fe+Mn)], and 1.9 g of KCl (the quantity of KCl with respect to total weight of magnetite, $K_2CO_3$ and $Mn_22O_3$ is 10.0 % by weight), was heat-treated at 875° C. in air for 1.0 hour. The obtained product was washed with water, and then dried, thereby obtaining dark brown particles.

Figure 4:
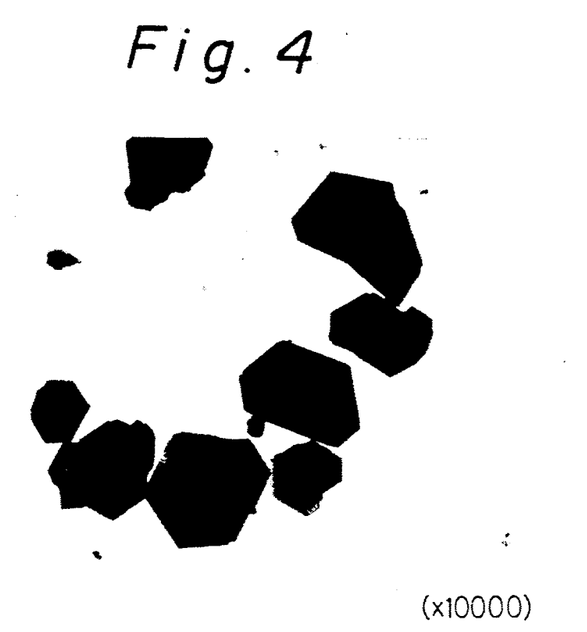
FIG. 4 is an electron micrograph (× 10,000) showing the particle structure of the potassium ferrite particles obtained in Example 11.

As shown by the electron micrograph in FIG. 4 (×10,000), the dark brown particles were plate-like particles of an average particle diameter of 1.5 μm, and were independently distributed. As a result of fluorescent X-ray spectroscopy, the quantity of Mn in the form of solid solution was 15 atomic %. The obtained particles had a lightness L* of 24.0, a hue $\theta = \tan^{-1} b^*/a^*$ of 37.0, and a chroma $C^*ab = \sqrt{a^{*2} + b^{*2}}$ of 3.2.

Figure 5:
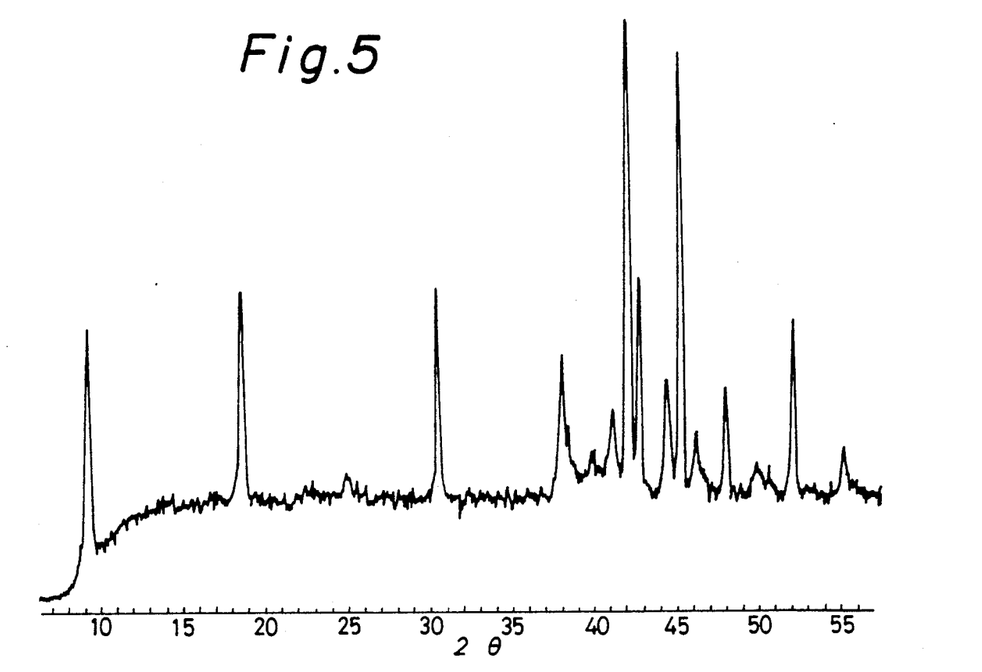
FIG. 5 is an X-ray diffraction pattern of the potassium ferrite particles obtained in Example 11.

Further, as seen from X-ray diffraction pattern in FIG. 5, peaks corresponding to potassium $\beta''$ ferrite was revealed By the application of an external magnetic field of 10 KOe, a magnetization was approx. 0.89 emu/g, which is roughly about the same as for hematite.

The obtained dark brown particles were further heated at 550° C. for 2.0 hours to examine its heat-stability. The resulting dark brown particles had a lightness L* of 24.5, a hue $\theta = \tan^{-1} b^*/a^*$ of 37.2, and a chroma $C^*ab = \sqrt{a^{*2} + b^{*2}}$ of 3.3. This confirmed that there was substantially no color change, and that the particles had excellent heat-stability.

EXAMPLES 12-16

Potassium ferrite particles were produced in the same way as in Example 11, excepting that the kinds and amounts of iron oxide particles and ferric oxide hydroxide particles, the Mn content, Al content and amounts used, the kinds and mixing amounts of Mn compounds, the kinds and mixing amounts of Al compounds, the kinds, proportions and amounts of fusing agents, and the heat-treating temperature and time, were varied.

Tables 3-5 show the principal manufacturing conditions and properties of the products obtained Examination of electron micrographs showed that the potassium ferrite particles obtained in Examples 12-16 were independently distributed.

COMPARATIVE EXAMPLE 2

A dark brown particles were obtained in the same way as in Example 11, excepting that $B_2O_3$ was used as a fusing agent.

The X-ray diffraction pattern of the obtained dark brown particles showed no peak due to potassium ferrite and, therefore, that potassium ferrite was not produced.

EXAMPLE 17

A mixture of 6.0 g of spherical magnetite particles having an average particle diameter of 0.02 μm, 2.03 g of $K_2CO_3$, 11.2 g of $Al(OH)_3$ [corresponding to 65 atomic % calculated as Al/(Fe+Al)] and 1.9 g of KCl (the quantity of KCl with respect to total weight of magnetite, $Al(OH)_3$ and $K_2CO_3$ is 10.0 % by weight), was heat-treated at 875° C. in air for 1.0 hour. The obtained product was washed with water, and then dried, thereby obtaining bright light brown particles.

Figure 6:
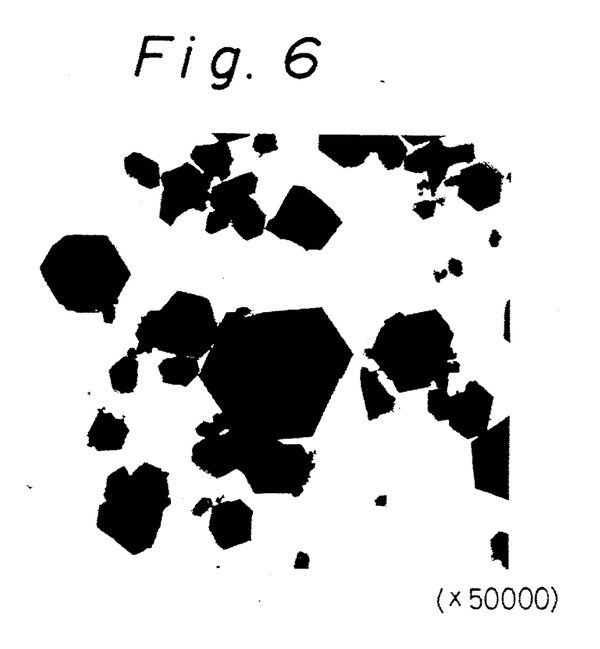
FIG. 6 is an electron micrograph (× 50,000) showing the particle structure of the potassium ferrite particles obtained in Example 17.

As shown by the electron micrograph in FIG. 6 (×50,000), the bright light brown particles were plate-like particles of an average particle diameter of 0.2 μm, and were independently distributed. As a result of fluorescent X-ray spectroscopy, the quantity of Al in the form of solid solution was 65 atomic %. The obtained particles had a lightness L* of 44.1, a hue $\theta = \tan^{1} b^*/a^*$ of 45.3°, and a chroma $C^*ab = \sqrt{a^{*2} + b^{*2}}$ of 48.0.

Figure 7:
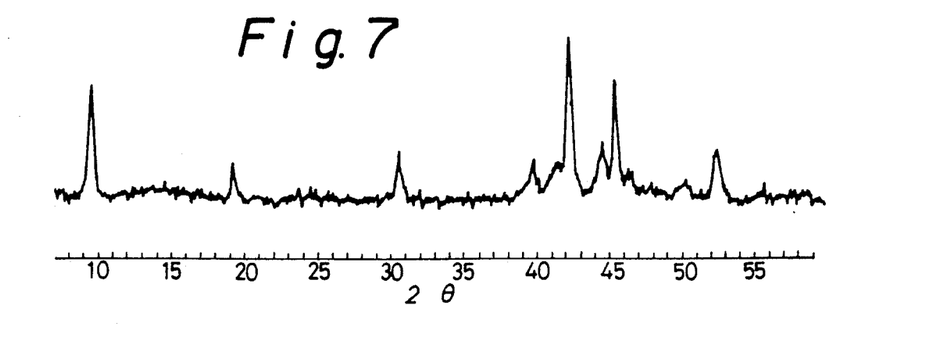
FIG. 7 is an X-ray diffraction pattern of the potassium ferrite particles obtained in Example 17.

Further, the X-ray diffraction pattern in FIG. 7 revealed peaks corresponding to the structure of potassium $\beta$ ferrite. By the application of an external magnetic field of 10 KOe, a magnetization thereof was approx. 0.33 emu/g, which is roughly about the same as for hematite.

The obtained bright light brown particles were further heated at 550° C. for 2.0 hours to examine its heat stability. The resulting bright light brown particles had a lightness L* of 44.2, a hue $\theta = \tan^{-1} b^*/a^*$ of 45.3°, and a chroma $C^*ab = 30\ b^{*2}$ of 48.3. This confirmed that there was substantially no color change, and that the powder has excellent heat-stability.

EXAMPLES 18-22

Potassium ferrite particles were produced in the same way as in Example 17, excepting that the kinds of iron oxide particles and ferric oxide hydroxide particles, the Al content and amount used, the kinds and mixing amounts of Al compounds, the kinds and amounts of fusing agents, and the heat-treating temperature and time, were varied.

Tables 6 and 7 show the principal manufacturing conditions and properties of the products obtained.

Examination of electron micrographs showed that the potassium ferrite particles obtained in Examples 18-22 were independently distributed.

COMPARATIVE EXAMPLE 3

A red-brown particles were obtained in the same way as in Example 17, excepting that $B_2O_3$ was used as a fusing agent.

The X-ray diffraction pattern of the obtained red-brown particles showed no peak due to potassium ferrite, and, therefore, that potassium ferrite was not produced.

TABLE 1

| Examples | Iron oxide particles or ferric oxide hydroxide particles | | | | $K_2CO_3$ Amount used (g) | Fusing agent | | | Heat-treatment | |
|---|---|---|---|---|---|---|---|---|---|---|
| | Kinds | Shape | Average particle diameter (μm) | Amount used (g) | | Kinds | Weight ratio | Amount (% by weight) | Temperature (°C.) | Time (hrs.) |
| 1 | $Fe_3O_4$ | Spherical | 0.02 | 14.5 | 1.73 | KCl | — | 10 | 875 | 1.0 |
| 2 | $Fe_3O_4$ | Spherical | 0.02 | 14.5 | 1.73 | $KCl + K_2SO_4$ | 1:1 | 10 | 875 | 1.0 |
| 3 | $Fe_3O_4$ | Spherical | 0.01 | 14.5 | 1.73 | $KCl + K_2SiO_3$ | 10:1 | 10 | 875 | 1.0 |
| 4 | $Fe_3O_4$ | Spherical | 0.02 | 14.5 | 1.73 | $KCl + K_2SO_4$ | 10:1 | 10 | 875 | 0.5 |
| 5 | $Fe_3O_4$ | Spherical | 0.02 | 14.5 | 1.73 | $KCl + NaCl$ | 10:1 | 10 | 875 | 1.0 |
| 6 | $Fe_3O_4$ | Spherical | 0.01 | 14.5 | 1.73 | $KCl + B_2O_3$ | 10:1 | 10 | 875 | 1.0 |
| 7 | $Fe_3O_4$ | Spherical | 0.02 | 14.5 | 1.73 | $K_2SO_4 + NaCl$ | 10:1 | 10 | 900 | 2.0 |
| 8 | $\alpha\text{-}Fe_2O_3$ | Irregular | 0.3 | 10 | 1.75 | KCl | — | 70 | 880 | 1.0 |
| 9 | $\gamma\text{-}Fe_2O_3$ | Spherical | 0.04 | 10 | 1.73 | KCl | — | 20 | 860 | 1.0 |
| 10 | $\alpha\text{-}FeOOH$ | Acicular | 0.05 | 11.1 | 1.8 | $KCl + KBO_2$ | 10:1 | 40 | 950 | 1.0 |

TABLE 2

| | Potassium ferrite particles | | | | | | | Color after heat-stability test | | |
|---|---|---|---|---|---|---|---|---|---|---|
| | | Average particle diameter (μm) | Shape (Aspect ratio) | Color | | | Magnetization (emu/g) | | | |
| Examples | Crystal structure | | | Lightness L* | Hue θ (°) | Chroma C*ab | | Lightness L* | Hue θ (°) | Chroma C*ab |
| 1 | Potassium β ferrite and potassium β″ ferrite | 1.5 | Plate-like (7:1) | 32.90 | 37.98 | 19.60 | 0.83 | 32.87 | 37.96 | 19.62 |
| 2 | Potassium β ferrite and potassium β″ ferrite | 0.15 | Plate-like (4:1) | 37.34 | 48.23 | 24.48 | 0.78 | 37.33 | 48.22 | 24.46 |
| 3 | Potassium β ferrite and potassium β″ ferrite | 1.0 | Plate-like (10:1) | 33.90 | 38.10 | 18.18 | 0.86 | 33.87 | 38.05 | 18.20 |
| 4 | Potassium β ferrite and potassium β″ ferrite | 0.8 | Plate-like (7:1) | 34.35 | 39.25 | 17.92 | 0.81 | 34.33 | 39.23 | 17.91 |
| 5 | Potassium β ferrite and potassium β″ ferrite | 1.0 | Plate-like (8:1) | 33.80 | 38.21 | 18.20 | 0.82 | 33.80 | 38.18 | 18.22 |
| 6 | Potassium β ferrite and potassium β″ ferrite | 5.0 | Plate-like (12:1) | 30.90 | 35.70 | 19.02 | 0.87 | 30.88 | 35.68 | 19.04 |
| 7 | Potassium β ferrite and potassium β″ ferrite | 0.20 | Plate-like (5:1) | 37.00 | 47.51 | 24.00 | 0.83 | 37.01 | 47.48 | 24.02 |
| 8 | Potassium β ferrite and potassium β″ ferrite | 3.5 | Plate-like (9:1) | 31.45 | 36.90 | 19.00 | 0.82 | 31.42 | 36.69 | 19.10 |
| 9 | potassium β″ ferrite | 1.0 | Plate-like (10:1) | 33.55 | 38.20 | 18.50 | 0.82 | 33.55 | 38.10 | 18.51 |
| 10 | Potassium β ferrite and potassium β″ ferrite | 4.0 | Plate-like (11:1) | 31.20 | 35.50 | 19.10 | 0.83 | 31.18 | 35.45 | 19.15 |

TABLE 3

| | Iron oxide particles or ferric oxide hydroxide particles | | | | | | |
|---|---|---|---|---|---|---|---|
| Examples | Kinds | Shape | Average particle diameter (μm) | Mn/(Fe + Mn) (Atomic %) | Al/(Fe + Mn + Al) (Atomic %) | Amount used (g) | $K_2CO_3$ Amount used (g) |
| 11 | Magnetite | Spherical | 0.02 | — | — | 14.5 | 2.03 |
| 12 | Goethite | Acicular | 0.5 | 10 | 3 | 19.4 | 2.03 |
| 13 | Goethite | Acicular | 1.0 | — | — | 16.70 | 2.03 |
| 14 | Magnetite | Spherical | 0.1 | 5 | — | 20.1 | 2.03 |
| 15 | Magnetite | Spherical | 0.3 | — | — | 11.9 | 2.03 |
| 16 | Hematite | Spherical | 1.5 | — | — | 16.8 | 2.03 |

| | Mn compound | | | Al compound | | |
|---|---|---|---|---|---|---|
| Examples | Kinds | Mixing amount (g) | Mn/(Fe + Mn) (Atomic %) | Kinds | Mixing amount (g) | Al/(Fe + Mn + Al) (Atomic %) |
| 11 | $Mn_2O_3$ | 2.61 | 15 | — | — | — |
| 12 | — | — | 10 | — | — | — |
| 13 | $Mn_3O_4$ | 1.69 | 10 | $\gamma$-$Al_2O_3$ | 0.34 | 5 |
| 14 | — | — | — | AlOOH | 1.33 | 10 |
| 15 | $Mn_2O_3$ | 1.66 | 10 | $Al(OH)_3$ | 3.45 | 20 |
| 16 | $MnO_2$ | 0.96 | 5 | — | — | — |

TABLE 4

| | Fusing agent | | | Heat-treatment | |
|---|---|---|---|---|---|
| Examples | Kinds | Weight ratio | Amount (% by weight) | Temperature (°C.) | Time (hrs.) |
| 11 | KCl | — | 10 | 875 | 1.0 |
| 12 | $K_2SO_4$ + KCl | 1:1 | 10 | 875 | 1.0 |
| 13 | KCl | — | 10 | 875 | 0.5 |
| 14 | KCl + $K_2SiO_3$ | 10:1 | 10 | 875 | 1.0 |
| 15 | KCl + NaCl | 10:1 | 10 | 875 | 1.0 |
| 16 | KCl + $B_2O_3$ | 10:1 | 30 | 890 | 1.0 |

TABLE 5

Potassium ferrite particles

TABLE 5-continued

| Examples | Crystal structure | Average particle diameter (μm) | Shape (Aspect ratio) | Mn/(Fe + Mn) (Atomic %) | Al/(Fe + Mn + Al) (Atomic %) |
|---|---|---|---|---|---|
| 11 | Potassium β″ ferrite | 1.5 | Plate-like (7:1) | 15 | — |
| 12 | Potassium β″ ferrite | 2 | Plate-like (9:1) | 10 | 3 |
| 13 | Potassium β″ ferrite | 3 | Plate-like (8:1) | 10 | 5 |
| 14 | Potassium β″ ferrite | 0.9 | Plate-like (10:1) | 5 | 10 |
| 15 | Potassium β″ ferrite | 0.7 | Plate-like (7:1) | 10 | 20 |
| 16 | Potassium β″ ferrite | 7 | Plate-like (5:1) | 5 | — |

| | Potassium ferrite particles | | | | | | |
|---|---|---|---|---|---|---|---|
| | Color | | | Magnet-ization (emu/g) | Color after heat-stability Test | | |
| Examples | Lightness L* | Hue θ (°) | Chroma C*ab | | Lightness L* | Hue θ (°) | Chroma C*ab |
| 11 | 24.0 | 37.0 | 3.2 | 0.89 | 24.5 | 37.2 | 3.3 |
| 12 | 25.2 | 38.5 | 5.1 | 0.89 | 25.1 | 38.9 | 5.2 |
| 13 | 25.9 | 36.5 | 6.3 | 0.88 | 26.1 | 36.4 | 6.2 |
| 14 | 29.2 | 38.2 | 11.7 | 0.78 | 29.1 | 38.0 | 11.5 |
| 15 | 25.4 | 36.0 | 4.2 | 0.75 | 25.5 | 36.2 | 4.0 |
| 16 | 28.5 | 36.5 | 10.5 | 0.90 | 28.5 | 36.2 | 10.7 |

TABLE 6

| | Iron oxide particles or ferric oxide hydroxide particles | | | | | |
|---|---|---|---|---|---|---|
| Examples | Kinds | Shape | Average particle diameter (μm) | Al/(Fe + Al) (Atomic %) | Amount used (g) | K₂CO₃ Mixing amount (g) |
| 17 | Magnetite | Spherical | 0.02 | — | 6.0 | 2.03 |
| 18 | Goethite | Acicular | 1.5 | — | 18.7 | 2.03 |
| 19 | Goethite | Acicular | 0.5 | 3 | 19.5 | 2.03 |
| 20 | Magnetite | Spherical | 0.3 | — | 13.6 | 2.03 |
| 21 | Hematite | Spherical | 2.0 | — | 17.1 | 2.03 |
| 22 | Maghemite | Acicular | 0.5 | — | 15.9 | 2.03 |

| | Al compound | | | Fusing agent | | Heat-treatment | |
|---|---|---|---|---|---|---|---|
| Examples | Kinds | Mixing amount (g) | Al/(Fe + Al) (Atomic %) | Kinds | Weight ratio | Amount (% by weight) | Temperature (°C.) | Time (hrs.) |
| 17 | Al(OH)₃ | 11.2 | 65 | KCl | — | 10 | 875 | 1.0 |
| 18 | AlOOH | 0.7 | 5 | K₂SO₄ + KCl | 1:1 | 10 | 890 | 1.0 |
| 19 | — | — | — | KCl | — | 10 | 865 | 1.0 |
| 20 | γ-Al₂O₃ | 2.3 | 20 | KCl + K₂SiO₃ | 10:1 | 10 | 875 | 1.0 |
| 21 | γ-Al₂O₃ | 0.3 | 3 | KCl + NaCl | 10:1 | 10 | 875 | 1.0 |
| 22 | Al(OH)₃ | 1.7 | 10 | KCl + B₂O₃ | 10:1 | 10 | 860 | 0.5 |

TABLE 7

| | Potassium ferrite particles | | | | | | | Magnet-ization (emu/g) | Color after heat-stability Test | | |
|---|---|---|---|---|---|---|---|---|---|---|---|
| | | Average particle diameter (μm) | Shape (Aspect ratio) | Al/(Fe + Al) (Atomic %) | Color | | | | | | |
| Examples | Crystal structure | | | | Lightness L* | Hue θ (°) | Chroma C*ab | | Lightness L* | Hue θ (°) | Chroma C*ab |
| 17 | Potassium β″ ferrite | 0.2 | Plate-like (5:1) | 65 | 44.1 | 45.3 | 48.0 | 0.33 | 44.2 | 45.8 | 48.3 |
| 18 | Potassium β″ ferrite | 4 | Plate-like (8:1) | 5 | 35.6 | 43.2 | 26.1 | 0.65 | 35.7 | 43.1 | 26.2 |
| 19 | Potassium β″ ferrite | 0.8 | Plate-like | 3 | 34.5 | 42.0 | 24.1 | 0.70 | 34.5 | 42.0 | 24.1 |

TABLE 7-continued

| | Potassium ferrite particles | | | | | | | | | |
|---|---|---|---|---|---|---|---|---|---|---|
| | | Average particle | Shape | | Color | | | Magnet- iza- | Color after heat- stability Test | | |
| Ex- amples | Crystal structure | diameter (μm) | (Aspect ratio) | Al/(Fe + Al) (Atomic %) | Light- ness L* | Hue θ (°) | Chroma C*ab | tion (emu/g) | Light- ness L* | Hue θ (°) | Chroma C*ab |
| 20 | Potassium β" ferrite | 1.2 | Plate- like (8:1) | 20 | 36.9 | 47.2 | 29.3 | 0.65 | 37.0 | 46.9 | 29.5 |
| 21 | Potassium β" ferrite | 7 | Plate- like (7:1) | 3 | 35.1 | 44.2 | 20.5 | 0.66 | 35.2 | 44.3 | 20.7 |
| 22 | Potassium β" ferrite | 2 | Plate- like (8:1) (6:1) | 10 | 37.2 | 43.5 | 30.7 | 0.62 | 37.4 | 43.7 | 30.5 |

What is claimed is:

1. A non-magnetic pigment comprising plate-like potassium ferrite particles having and average diameter of 0.03–30.0 μm.

2. A non-magnetic pigment according to claim 1, wherein an aspect ratio of the plate-like potassium ferrite particles is 3:1–20:1.

3. A non-magnetic pigment according to claim 1, wherein a magnetization of the plate-like potassium ferrite particles is not more than 2.0 emu/g.

4. A non-magnetic pigment according to claim 1, showing a light brown color and having a lightness L* of 30–45, a hue θ of 33°–55° and a chroma C*ab of 15–27.

5. A non-magnetic pigment according to claim 1, comprising plate-like potassium ferrite particles containing Mn in the form of solid solution.

6. A non-magnetic pigment according to claim 5, wherein a quantity of Mn in the form of solid solution is 0.1–20.0 atomic % with respect to the total amount of Fe and Mn.

7. A non-magnetic pigment according to claim 5, showing a dark brown color and having a lightness L* of 20–38, a hue θ of 20°–50°, and a chroma C*ab of 1–30.

8. A non-magnetic pigment according to claim 1, comprising plate-like potassium ferrite particles containing Mn and Al in the form of solid solution.

9. A non-magnetic pigment according to claim 8, wherein a quantity of Mn in the form of solid solution is 0.1–20 atomic % with respect to the total amount of Fe, Mn and Al, and a quantity of Al in the form of solid solution is not more than 60 atomic % with respect to the total amount of Fe, Mn and Al.

10. A non-magnetic pigment according to claim 8, showing a dark brown color and having a lightness L* of 20–40, a hue θ of 20°–50°, and a chroma C*ab of 1–30.

11. A non-magnetic pigment according to claim 1, comprising plate-like potassium ferrite particles containing Al in the form of solid solution.

12. A non-magnetic pigment according to claim 11, wherein the quantity of Al in the form of solid solution is 0.1–80.0 atomic % with respect to the total amount of Fe and Al.

13. A non-magnetic pigment according to claim 11, showing a bright light brown color and having a lightness L* of 30–48, a hue θ of 30°–50°, and a chroma C*ab of 15–50.

14. A process for producing a non-magnetic pigment as defined in claim 1, comprising heat-treating a mixture of iron oxide particles, ferric oxide hydroxide particles or a mixture thereof having an average particle diameter of 0.003–30.0 μm with potassium carbonate and one or more fusing agents selected from the group alkali metal chloride, sulfate, borate and silicate, at a temperature of 830°–1200° C.

15. A process according to claim 14, wherein boric acid is also added to said mixture as a fusing agent.

16. A process according to claim 14, wherein Mn-containing iron oxide particles and Mn-containing ferric oxide hydroxide particles are used as the iron oxide particles and ferric oxide hydroxide particles, or Mn compounds are added to said mixture, such that the quantity of Mn with respect to the total amount of Fe and Mn is 0.1–20.0 atomic %, thereby obtaining the non-magnetic comprising plate like potassium ferrite particles.

17. A process according to claim 14, wherein Mn and Al-containing iron oxide particles and Mn and Al-containing ferric oxide hydroxide particles are used as the iron oxide particles and ferric oxide hydroxide particles, or Mn and Al compounds are added to said mixture, such that the quantity of Mn with respect to the total amount of Fe, Mn and Al is 0.1–20.0 atomic %, and the quantity of Al with respect to the total amount of Fe, Mn and Al is not more than 60.0 atomic %, thereby obtaining comprising plate like potassium ferrite particles.

18. A process according to claim 14, wherein Al-containing iron oxide particles and Al-containing ferric oxide hydroxide particles are used as the iron oxide particles and ferric oxide hydroxide particles, or Al compounds are added to said mixture, such that the quantity of Al with respect to the total amount of Fe and Al is 0.1–80.0 atomic %, thereby obtaining the non-magnetic.

* * * * *

UNITED STATES PATENT AND TRADEMARK OFFICE
CERTIFICATE OF CORRECTION

PATENT NO. : 5,009,712

DATED : April 23, 1991

INVENTOR(S) : TAMARI et al

It is certified that error appears in the above-identified patent and that said Letters Patent is hereby corrected as shown below:

Column 1, line 38, change "is" to --are--.

Column 8, line 68, "$Mn_220_3$" should be -- $Mn_2O_3$ --.

Column 10, line 14, "$tan^1 b*/a*$" should be -- $tan^{-1} b*/a*$ --.

Column 16, line 38 (claim 16) "pigment" should be --non-magnetic pigment--.

Column 16, line 49 (claim 17), after "obtaining" insert --the non-magnetic pigment--.

Column 16, line 58 (claim 18), after "non-magnetic" insert --pigment comprising plate-like potassium ferrite particles--.

Signed and Sealed this

Twenty-fifth Day of May, 1993

Attest:

MICHAEL K. KIRK

Attesting Officer

Acting Commissioner of Patents and Trademarks